United States Patent [19]

Self

[11] 4,013,614
[45] Mar. 22, 1977

[54] METHOD OF PREPARING SHAPED ARTICLES FROM POLYMERIZABLE COMPOSITIONS

[75] Inventor: James M. Self, Taylor, S.C.

[73] Assignee: H. H. Robertson Company, Pittsburgh, Pa.

[22] Filed: May 6, 1976

[21] Appl. No.: 684,067

Related U.S. Application Data

[63] Continuation-in-part of Ser. No. 544,966, Jan. 29, 1975, which is a continuation-in-part of Ser. No. 460,489, April 12, 1974, abandoned.

[52] U.S. Cl. .............................. 260/40 R; 156/325; 156/332; 427/426
[51] Int. Cl.² .......................................... C08K 3/34
[58] Field of Search ............ 156/325, 332; 427/426; 260/40 R

[56] References Cited

UNITED STATES PATENTS

| | | | |
|---|---|---|---|
| 2,319,826 | 5/1943 | Pellett | 156/332 |
| 2,644,771 | 7/1953 | Kempthorne | 427/426 |
| 2,922,729 | 1/1968 | Dereich | 156/325 |
| 3,676,197 | 7/1972 | Harrison et al. | 427/426 |

*Primary Examiner*—Donald E. Czaja
*Assistant Examiner*—S. M. Person
*Attorney, Agent, or Firm*—Harry B. Keck; George E. Manias

[57] ABSTRACT

A method for preparing polymerized products by spraying unsaturated polyester resin syrup, aqueous sodium silicate and a polymerization initiator for the unsaturated polyester resin syrup. The ingredients preferably are formed into sprays which are mixed by impingement. Alternatively the ingredients may be combined into a single spray. These sprays may include inert fillers in spray form. Preferably the sprays are impinged upon inert fillers including chopped fibrous reinforcements such as glass fibers.

11 Claims, No Drawings

METHOD OF PREPARING SHAPED ARTICLES FROM POLYMERIZABLE COMPOSITIONS

CROSS-REFERENCES TO RELATED APPLICATIONS

This application is a continuation-in-part of copending application Ser. No. 544,966, filed Jan. 29, 1975, which was in turn a continuation-in-part of application Ser. No. 460,489 filed Apr. 12, 1974, now abandoned. Another copending application, Ser. No. 655,012, filed Feb. 4, 1976, is a continuation-in-part of Ser. No. 597,673, filed June 21, 1975 (now abandoned) which was in turn a continuation-in-part of the aforesaid Ser. No. 460,489.

BACKGROUND OF THE INVENTION

1. Field of the Invention

This invention relates to spray-up compositions of polymerizable unsaturated polyester resin syrup compositions and significant quantities of aqueous sodium silicate.

2. Description of the Prior Art

The aforesaid U.S. Patent application Ser. No. 544,966 describes and claims polymerizable compositions of unsaturated polyester resin syrup and aqueous sodium silicate. All of the disclosure of the aforesaid application is incorporated herein by reference.

SUMMARY OF THE INVENTION

The present invention concerns the use of spray methods for producing polymerized articles from unsaturated polyester resin syrup and aqueous sodium silicate.

In one embodiment unsaturated polyester resin syrup is mixed with aqueous sodium silicate and a polymerization initiator for the unsaturated polyester resin syrup. The resulting alkaline mixture is formed into a spray which is directed onto a substrate and, upon settling, is allowed to cure to a thermoset condition. The mixture, prior to spraying, may also include some particulate inert fillers if desired so long as the presence of the fillers does not adversely affect the spraying properties of the mixture. The spray may be combined with particulate fillers or fibrous fillers by impingement against a stream of such fillers or fibers.

In an alternative embodiment, two separate sprays are formed wherein a first spray includes the unsaturated polyester resin syrup and a second spray includes the aqueous sodium silicate. A suitable polymerization initiator for the unsaturated polyester resin syrup is included in one of the two sprays. Either or both of the two sprays may include finely divided particulate inert filler so long as the presence of the filler does not adversely affect the spraying properties of the materials. Preferably the two sprays are caused to impinge upon one another and thus form an alkaline mixture which is deposited as a combined spray on a suitable substrate. Inert particulate fillers may be introduced into the combined sprays by means of a gas-borne stream of fillers or fibers.

In another embodiment, fiber-reinforced laminates may be prepared by a sequential process involving:

FIRST: spraying the alkaline mixture onto a substrate as a deposited coating;

SECOND: applying fibrous reinforcement to the deposited coating;

THIRD: spraying the alkaline mixture onto the applied fibrous reinforcement;

FOURTH: curing the alkaline mixture; and

FIFTH: recovering a laminated fiber-reinforced, thermoset article.

In another embodiment, metal-reinforced laminates may be prepared by a sequential process involving:

FIRST: spraying the alkaline mixture onto a substrate as a deposited coating, with or without glass fibers;

SECOND: depositing a metal screen, such as expanded metal lath, onto the deposited coating;

THIRD: spraying additional alkaline mixture onto the metal screen, with or without glass fibers;

FOURTH: curing the alkaline mixture;

FIFTH: recovering a metal-reinforced, thermoset laminated article.

The weight of aqueous sodium silicate is about 0.1 to 10 parts by weight of the unsaturated polyester resin syrup, preferably 0.3 to 5 parts by weight. The aqueous sodium silicate contains 45 to 85 parts by weight water and 55 to 15 parts by weight sodium silicate solids having a weight ratio of $SiO_2/Na_2O$ from 1.5 to 3.75.

Unsaturated polyester resin syrup is employed herein to identify what is well-known in the art as the combination of an unsaturated polyester resin and a copolymerizable monomer, such as styrene.

Unsaturated polyester resins are customarily fabricated from polyesterification of polycarboxylic acids or polycarboxylic acid anhydrides and polyols, customarily glycols. One of the ingredients in the polyester contains ethylenic unsaturation, customarily the polycarboxylic acid. Typically unsaturated polyester resins are fabricated from dicarboxylic acids such as phthalic acid, phthalic anhydride, adipic acid, succinic acid, tetrahydrophthalic acid or anhydride, tetrabromo phthalic acid or anhydride, maleic acid or anhydride, fumaric acid. Typical glycols include ethylene glycol, propylene glycol, butylene glycol, neopentyl glycol, diethylene glycol, dipropylene glycol, polyethylene glycol, polypropylene glycol. Occasionally trihydric and higher polyols are included in the polyester such as trimethylol ethane, trimethylol propane, pentaerythritol. Customarily a slight stoichiometric excess of glycol is employed in preparing the unsaturated polyester.

Unsaturated polyester resin syrups are prepared when the unsaturated polyester resin is combined with copolymerizable monomers which contain terminal vinyl groups. Such monomers include styrene, alpha-methyl styrene, o-chloro-styrene, vinyl toluene, acrylic acid, methacrylic acid, alkyl acrylates, alkyl methacrylates, divinyl benzene, diacrylates, dimethacrylates, triacrylates, trimethacrylates and the like. Customarily the copolymerizable monomer is provided in an amount to constitute from about 10 to 40 weight percent of the unsaturated polyester resin syrup, i.e., the unsaturated polyester resin comprises about 90 to 60 weight percent of the resin syrup.

A desirable modifying copolymerizable monomer is a reaction product of polyepoxide with acrylic or methacrylic acid. Such products are described in U.S. Pat. Nos. 3,373,075, 3,301,743. Similar products can be prepared by combining a polyol such as bisphenol-A with glycidyl acrylate or glycidyl methacrylate. Such modifying copolymerizable monomers can be employed as a partial replacement for other copolymerizable monomers or as a partial replacement for a portion of the unsaturated polyester resin of the resin syrup.

Typical initiators for unsaturated polyester resin syrups include peroxy materials such as benzoyl peroxide, cumene hydroperoxide, tertiary butyl peroxide and the like. A particularly useful peroxy initiator for room temperature curing is 2,5-dimethyl hexane-2,5-dimethyl-diper-2-ethyl hexoate. The peroxy initiators customarily are provided in the form of pastes in which the peroxy material is dispersed in a glycol. Accelerators for the peroxy initiators include cobalt naphthenate and cobalt octoate, for example.

FILLERS

A preferred active filler is aluminum oxide trihydrate $Al_2O_3.3H_2O$, also known as hydrated alumina. This material may be incorporated into either or both of the liquid components in quantities up to about 1.5 times the weight of the unsaturated polyester resin syrup and up to about 3 times the weight of the aqueous sodium silicate. Preferably the aluminum oxide trihydrate is pulverized in a fineness approximating minus-325 mesh U.S. standard screen. The inclusion of aluminum oxide trihydrate in the products increases their physical strength, e.g. hardness and abrasion resistance. The hydrated alumina also introduces fire-retardant properties into the products.

The inert fillers may include, for example, ground glass, glass microspheres, silica, magnesium oxide, mullite, fly ash, zirconia, clays, betonite, kaolin, attipulgite, titanium dioxide, antimony oxide, pigments, low density insulating materials such as perlite or expanded vermiculite, fibrous reinforcing material such as glass fibers, asbestos fibers, mineral wool.

The laminates may be further reinforced by embedding metal screen, e.g., expanded metal lath, between deposited coatings of the thermosetting alkaline mixture.

EXAMPLE 1

An unsaturated polyester resin syrup (hereinafter identified as resin syrup I) contains 25 parts by weight styrene and 75 parts by weight of the unsaturated polyester resin which is obtained as follows:

60 mols phthalic anhydride
40 mols maleic anhydride
106 mols propylene glycol are combined and esterified to an acid number of about 20 to produce a general purpose unsaturated polyester resin which is employed in most of the examples hereinafter.

EXAMPLE 2

A sprayable system is prepared by assembling ingredients in the manner to be described.

| Component 1 | | |
| --- | --- | --- |
| Unsaturated polyester resin syrup I | 16 | pounds |
| Styrene | 3 | pounds |
| Benzoyl peroxide powder | 0.9 | pounds |
| Triton X-100 (surfactant) | 0.25 | pounds |
| Aluminum oxide trihydrate (minus-325 mesh U.S. standard screen) | 23 | pounds |
| Total | 43.15 | pounds |

| Component 2 | | |
| --- | --- | --- |
| Aqueous sodium silicate (as in Example 1) | 10 | pounds |
| Water | 10 | pounds |
| Styrene | 0.5 | pounds |
| N,N'-dimethyl aniline | 1 | ounce |
| Triton X-100 (surfactant) | 0.25 | pounds |
| Aluminum oxide trihydrate (minus-325 mesh U.S. standard screen) | 30 | pounds |
| Total | 50.8 | pounds |

Note: The N,N'-dimethyl aniline is dissolved in the styrene and the solution is added to component 2.

Components 1 and 2 are sprayed on various substrates by two different methods.

Method 1 — A dual head spray gun includes two separate spray heads. Component 1 is sprayed through one spray head; component 2 is sprayed through the other spray head. The sprays are impinged approximately 6 inches beyond the spray nozzles to achieve intimate mixing.

Method 2 — A spray gun having a mixing chamber is employed in such manner that component 1 and component 2 are mixed within the mixing chamber and spayed as a mixture onto the substrate.

In both spraying systems, a glass roving chopper is positioned adjacent to the spray patterns to deposit chopped glass fibers approximately 2 inches long into the spray patterns in order to incorporate the glass fibers into a spray-up composition. The sprayed compositions have been applied to ordinary steel sheets, galvanized steel sheets, glass fiber reinforced polyester resin panels, a dry wall, a wood plank, an acrylic resin sheet, a sheet of paper, a sheet of stainless steel, a concrete surface, a sheet of expanded metal lath, a cotton cloth, a polyester fiber cloth, a sheet of leather, a sheet of rubber, a sheet of rigid polyurethane foam and a glass plate. In all cases the sprayed-on material adheres well to the substrate. Adhesion is obtained with substrates disposed vertically, disposed in a sloping position, disposed horizontally below the spray and disposed horizontally above the spray. The resulting coatings have been produced in thicknesses from about 1/16 inch to thicknesses of several inches. Curing of the coatings occurs within a matter of several minutes.

It will be observed that component 1 contains an abnormally high quantity of benzoyl peroxide as a catalyst. The reason for employing excess catalyst in these tests is to assure prompt curing of the composition in order to permit handling of the coated substrate in a very short period of time following the spraying.

Additional styrene is included in his series of tests to facilitate the spraying of component 1.

The additional water in Example 2 is added to lower the viscosity of component 2 to facilitate spraying.

It will also be observed that the total formulation contains more than 56 percent by weight alumina trihydrate. The two components 1 and 2 are sprayed in approximately equal weight ratios.

EXAMPLE 3

The formulations described in Example 2 are applied to both sides of a sheet of expanded metal lath to produce a panel. The expanded metal lath was 2 feet by 8 feet. The product can be prepared in the following manner. A sheet of cellophane is spread on a table. A coating of the present composition along with approximately 6 percent by weight glass fiber is applied to the cellophane sheet. Thereafter a sheet of expanded metal lath is deposited on top of the composition and rolled for partial embedment in the composition. Thereafter an additional coating of the present composition along with approximately 6 percent by weight glass fibers is applied on top of the expanded metal lath. The top coating is covered with another sheet of cellophane and the panel is allowed to cure.

A panel produced in this fashion was 3/8 inch thick.

The panel just described was subjected to a flame spread tunnel test similar to the ASTM E84 tunnel test. The panel rated as follows:

Flame spread: 7.69
Smoke generation: 1.56

EXAMPLE 4

A building was sprayed with the present coating composition. The building was a corrugated metal panel building having a centrally pitched roof. The roofing panels were uncoated steel surfaces. The vertical side wall panels had been previously coated with a spray-applied polyurethane foam coating approximately one inch thick as thermal insulation. The vertical walls had a total surface area of about 4,000 square feet.

Component 1 of the coating composition was prepared by combining:

unsaturated polyester resin syrup I — 45 pounds;
hydrated alumina, minus-325 mesh U.S. standard screen — 50 pounds;
benzoyl peroxide (50 percent by weight in a suitable plasticizer) — 1 pound.

Component 2 was prepared by combining:

N grade aqueous sodium silicate — 35 pounds;
water — 10 pounds;
hydrated alumina, minus-325 mesh U.S. standard screen — 70 pounds;
dimethyl aniline — 125 grams.

Components 1 and 2 were introduced at equal flow rates separately into the two spray heads of a dual head spray nozzle. The spray nozzle developed two cone sprays which impinged at a distance of 4 to 6 inches from the spray tips. The spray nozzles utilized exterior air atomizing. Components 1 and 2 were pumped at pressures of about 150 psi. The atomizing air pressure ranged from 40 to 90 psi. A chopped glass roving gun provided 1 inch long chopped strands of glass fiber roving at the region of spray impingement.

A fire retardant coating was spray-applied to the interior of the building over the polyurethane foam thermal insulation and also over the interior metal surfaces of the pitched roof panels. The coating was applied in three sequential operations as follows:

First step: A thin film of the two mixed liquid sprays, without glass fibers, was applied to a selected small area of the wall surface in order to wet the surface.

Second step: A film of glass fibers plus the mixed sprays was applied to the wetted surface.

Third step: A further film of the mixed sprays without glass fibers was applied on top of the coatings.

No deliberate attempt was made to roll the coating. Instead the glass fibers were allowed to settle as applied. Preponderantly the fibers laid flat upon the wall surfaces. The films adhered well to the foam surface and also to the bare metal roof panels. The thickness of the coating was varied intentionally to permit observation of the effect of different thicknesses. Thicknesses from about 1/16 inch to about ¼ inch were applied and observed. Coating thicknesses in this range had no observable effect on the adhesion properties.

Within about one hour after application the coating was free of tackiness.

The building interior was entirely coated with the described coating material. The coating serves as fire protection for the polyurethane foam thermal insulation on the vertical side walls. The function of the coating on the bare metal pitched roof panels in this installation is merely to demonstrate the adhesion characteristics. The present coatings would not normally be applied to the interior surfaces of bare metal pitched roof ceilings. However the present coating compositions have utility as fire barrier coatings when applied to the metal undersurfaces of steel floors.

EXAMPLE 5

Spray-up laminates were prepared on a cellophane sheet with the formulation and equipment described in Example 4. ASTM samples ⅛ inch thick were prepared and tested. The samples contained 20 percent glass fibers by weight. The observed physical properties were:

flexural strength — 8,873 psi
flexural modulus — $0.369 \times 10^6$
tensile strength — 5,521 psi
tensile modulus — $0.437 \times 10^6$ Added samples of this spray-up laminate, 14 centimeters long, 5 centimeters wide and a nominal ⅛ inch thick, were obtained. The density of the samples averaged 1.3 after drying at room temperature. These samples were exposed for 4,000 hours in weather-o-meter tests as described in National Bureau of Standards Publication 260-15 using Standard Reference Material 701-c. The samples exhibited some chalkiness on their surface. The samples retained whiteness and exhibited no gross deterioration.

Added samples of the spray-up laminate as described were placed in a condensing humidity cabinet at 150° F for 2500 hours exposure. The samples exhibited slight surface chalk and had no color change or loss of integrity.

EXAMPLE 6

Molded resinous bathtubs were fabricated with the present composition. The bathtubs were fabricated from a vacuum formed thermoplastic acrylic sheet having a nominal thickness of about 15 mils. The thermoplastic sheet was drawn into a mold having the shape of a bathtub and thereafter removed from the mold and supported in a suitable jig. Using formulations hereinafter to be described, three specific bathtubs were fabricated by hand-spray-up techniques. One bathtub had an approximately ⅛ inch thickness coating of the present composition; another tub had a 3/16 inch average thickness coating; the third tub had a coating of approximately ¼ inch average thickness. The coatings were applied by spraying an unsaturated polyester resin syrup into a spray of aqueous sodium silicate. The two sprays impinged upon a downwardly flowing stream of chopped glass fibers from a glass fiber roving chopper. The coating adhered to the convex surface of the vacuum formed thermoplastic acrylic sheet and was had rolled and worked to embed the fibers. The fibers constituted 25 to 30 percent of the weight of the coating. The resin mixture contained 50 pounds of an unsaturated polyester resin I (polyester to styrene ratio = 72/23),
10 pounds styrene,
27.4 grams hydroquinone, 40 pounds finely divided hydrated alumina (100 percent -325 mesh U.S. standard screen), and
544.8 grams benzoyl peroxide.

The aqueous sodium silicate included
20 pounds of N grade aqueous sodium silicate,
20 pounds water,
60 pounds finely divided hydrated alumina (100 percent -325 mesh U.S. standard screen), and
272 grams N,N'-dimethyl aniline.

The two liquid ingredients were maintained at 350 psi pressure and were sprayed by means of an airstream maintained at 90 to 100 psi. The glass fiber roving had a silane sizing and was chopped to approximately one-inch lengths. After 15 to 20 minutes the coatings had hardened and useful bathtubs were removed from the jigs.

I claim:

1. The method of preparing a cured thermoset article which comprises
   A. spraying an alkaline mixture onto a substrate as a continuous mass, said alkaline mixture comprising:
      1. component 1 comprising one part by weight of an unsaturated polyester resin syrup; and
      2. component 2 comprising 0.1 to 10 parts by weight of aqueous sodium silicate containing 45 to 85 weight percent water and 55 to 15 weight percent sodium silicate solids having a weight ratio of $SiO_2/Na_2O$ of 1.5 to 3.75;
   the said alkaline mixture including a polymerization initiator for unsaturated polyester resin syrup; and
   B. curing the said mass.

2. The method of claim 1 wherein the said polymerization initiator is an ingredient of component 1.

3. The method of claim 1 wherein the said polymerization initiator is an ingredient of component 2.

4. The method of claim 1 wherein component 1 is provided as an airborne spray and component 2 is provided as an airborne spray; and the two said sprays are impinged to produce the said alkaline mixture.

5. The method of claim 4 wherein the two said sprays impinge upon a stream of chopped glass fibers to produce glass fibers coated with the said alkaline mixture.

6. The method of claim 1 wherein the said component 1 and component 2 are formed into the said alkaline mixture which is then formed into a single spray.

7. The method of claim 6 wherein the said single spray is directed into a stream of chopped glass fibers prior to contacting the said substrate.

8. The method of claim 1 wherein the said alkaline mixture includes inert particulate fillers.

9. The method of claim 8 wherein the said inert particulate fillers are direcrted as a separate stream into the said alkaline mixture when the said alkaline mixture exists as a spray.

10. The method of claim 1 which comprises sequential steps including:
    FIRST: spraying the said alkaline mixture onto the said substrate as a deposited coating;
    SECOND: applying fibrous reinforcement to the said deposited coating;
    THIRD: spraying the said alkaline mixture onto the applied fibrous reinforcement;
    FOURTH: curing the said alkaline mixture;
    FIFTH: recovering a laminated fiber-reinforced, thermoset article.

11. The method of producing a metal-reinforced, thermoset laminated article comprising sequential steps including:
    FIRST: spraying an alkaline mixture of claim 1 onto a substrate as a deposited coating;
    SECOND: depositing a metal screen onto the said deposited coating;
    THIRD: spraying additional akaline mixture of claim 1 onto the said metal screen;
    FOURTH: curing the said alkaline mixture;
    FIFTH: recovering a metal-reinforced, thermoset laminated article.

* * * * *